(12) United States Patent
Hannesen

(10) Patent No.: US 8,846,263 B2
(45) Date of Patent: Sep. 30, 2014

(54) HOUSING ASSEMBLY FOR A FUEL CELL STACK

(75) Inventor: Uwe Hannesen, Schüpfen (CH)

(73) Assignee: Belenos Clean Power Holding AG, Bienne (CH)

( * ) Notice: Subject to any disclaimer, the term of this patent is extended or adjusted under 35 U.S.C. 154(b) by 0 days.

(21) Appl. No.: 13/544,193

(22) Filed: Jul. 9, 2012

(65) Prior Publication Data

US 2013/0017469 A1 Jan. 17, 2013

(30) Foreign Application Priority Data

Jul. 11, 2011 (EP) ..................................... 11173446

(51) Int. Cl.
*H01M 8/24* (2006.01)
*H01M 8/02* (2006.01)
(52) U.S. Cl.
CPC .............. *H01M 8/2475* (2013.01); *Y02E 60/50* (2013.01); *H01M 8/248* (2013.01)
USPC ....................................................... 429/452
(58) Field of Classification Search
None
See application file for complete search history.

(56) References Cited

U.S. PATENT DOCUMENTS

| 5,547,777 A | 8/1996 | Richards | |
| 7,435,501 B2 * | 10/2008 | Peace et al. | 429/435 |
| 2002/0127453 A1 | 9/2002 | Kitagawa et al. | |
| 2008/0268325 A1 * | 10/2008 | Bianchi et al. | 429/39 |
| 2009/0130511 A1 * | 5/2009 | Eshraghi et al. | 429/26 |

FOREIGN PATENT DOCUMENTS

| EP | 1 936 729 A1 | 6/2008 |
| GB | 2460928 A * | 12/2009 |

OTHER PUBLICATIONS

European Search Report of EP 11 17 3446 dated Jan. 5, 2012.

* cited by examiner

*Primary Examiner* — Patrick Ryan
*Assistant Examiner* — Christopher Domone
(74) *Attorney, Agent, or Firm* — Sughrue Mion, PLLC

(57) ABSTRACT

The present invention relates to a housing assembly for at least two fuel cells, comprising:
  a hollow profile-like body (12) extending in an axial direction (z) and being adapted to laterally encompass at least two fuel cells stacked on one another in axial direction (z), and
  a fastening mechanism to interconnect the body (12) with at least one end plate (18, 28) adapted to support the at least two fuel cells.

11 Claims, 4 Drawing Sheets

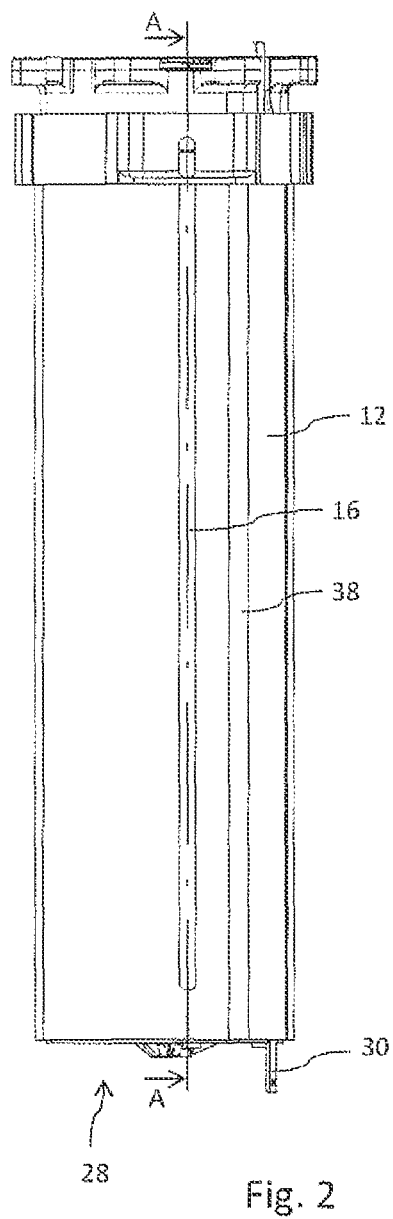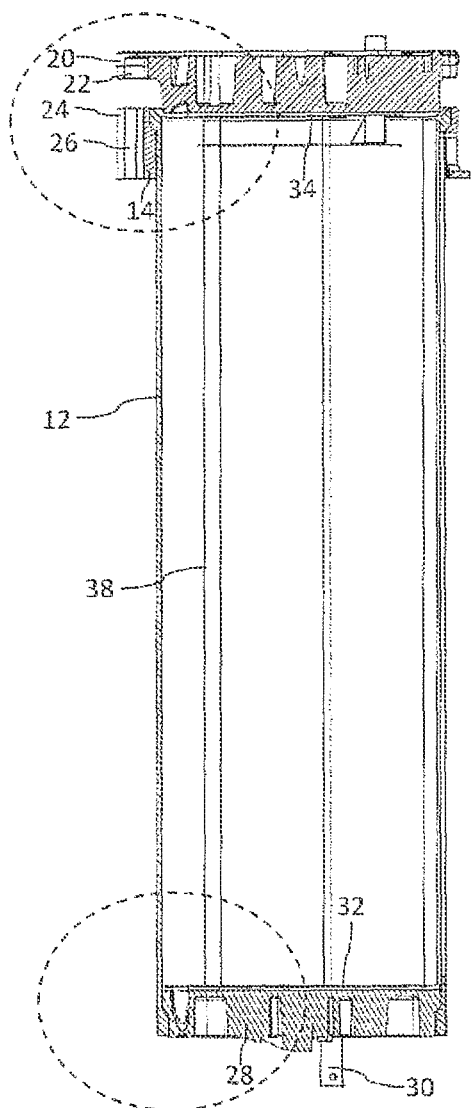
Fig. 2
Fig. 3
A-A

B-B

HOUSING ASSEMBLY FOR A FUEL CELL STACK

This application claims priority from European Patent Application No. 11173446.3 filed Jul. 11, 2011, the entire disclosure of which is incorporated herein by reference.

FIELD OF THE INVENTION

The present invention relates to fuel cell design and in particular to a housing adapted to receive a plurality of fuel cells stacked on one another.

BACKGROUND AND PRIOR ART

By means of electrochemical fuel cells, reactants, like a stream of hydrogen and a stream of oxygen can be converted into electric power and water. For example with polymer electrolyte fuel cell designs, an electrolyte membrane is typically interposed between an anode and a cathode to form a membrane electrode assembly (MEA). Since a single fuel cell only provides a rather limited maximum voltage, a pre-determined number of fuel cells are typically stacked on one another or next to each other to form a fuel cell stack, wherein adjacently disposed fuel cells are electrically contacted in series.

With proton exchange membrane fuel cells (PEMFC) but also with other fuel cell designs when making use of gaseous reactants it is necessary to precisely control the gas flow within the stack. In order to provide a gas tight sealing, a fuel cell stack sufficiently equipped with sealing elements is typically compressed along the stacking direction, e.g. by way of two end plates arranged at opposite ends of the fuel cell stack that are directly interconnected with each other by way of tension bolts.

However, such a fuel cell design is rather difficult to assemble since the various fuel cells, MEAs, sealing elements and separating structures may be twisted in a plane perpendicular to the stacking direction. As well, the entire fuel cell stack may be rather prone to torsion forces in use.

From document EP 1 936 729 A1 a casing for a fuel cell stack is known. There, the stack body is held in a casing including end plates. The casing also includes a plurality of separate side plates provided on sides of the stack body. End plates and side plates are coupled by coupling pins, wherein each of the side plates has a plurality of separate coupling portions adapted to receive the coupling pins. In effect, tension forces between the end plates have to be transferred via a plurality of coupling pins and corresponding coupling portions that may form a weakening spot being subject to considerable point loading in use. Moreover, the mutual interconnection of end plates and side plates is quite laborious. Also, an interconnection of side plates further requires separate assembly of angle profiles in a respective corner region.

It is therefore an object of the present invention to provide a housing assembly of improved stability, especially against torsion effects. Moreover, the housing assembly should be easy and intuitive to assemble. It should be long lasting, robust and light weight and also cost-efficient in production and assembly.

SUMMARY OF THE INVENTION

The present invention provides a housing assembly for at least two fuel cells, preferably for a stack of fuel cells comprising several tens or even more than hundred individual fuel cells stacked on one another. The housing assembly comprises a hollow profile-like body extending in an axial direction (z) and being adapted to laterally encompass at least two fuel cells being stacked on one another in axial direction. The housing assembly further comprises a fastening mechanism to interconnect the body with at least one end plate which is adapted to support the at least two fuel cells.

By providing a hollow profile-like body, the number of components required to form a closed casing for a fuel cell stack substantially reduces to the hollow profile body and to at least one end plate adapted to close said body after a number of fuel cells has been arranged inside said body to form a respective stack of fuel cells. The hollow profile-like body may comprise a somewhat tubular or cylindrical shape and may have a closed bottom face adapted to support the fuel cells stacked therein. By way of the fastening mechanism, the top end of the profile body can be closed in order to provide a substantially closed casing structure for the fuel cell stack.

By having a single hollow profile-like body, the housing assembly only comprises a single side wall element to form a lateral enclosure for the fuel cell stack. Hence, various side wall sections as for instance described in EP 1 936 729 A1 do no longer have to be interconnected. Also, the assembly process for interconnecting the at least one end plate with the hollow profile-like body becomes much easier and is therefore less time consuming.

According to a preferred embodiment, the body is adapted to transfer an axially directed tension or compression force between two end plates arranged at opposite axial end sections of the body. Consequently, the profile body not only provides a protective structure for the fuel cells to be stacked therein but also serves to transfer tension or compression forces between oppositely disposed end plates in order to establish and to maintain a gas tight sealing of gas flow channels extending through the stack. Hence, the hollow profile-like body may also replace and substitute the functionality of tension bolts ordinarily extending between oppositely disposed end plates of a fuel stack.

By having a substantially laterally closed hollow body, the entire fuel cell stack can be effectively stabilized against lateral and axial loads.

In a further preferred aspect, a first end plate is entirely inserted in the hollow body and comprises a laterally outwardly extending bearing structure which is adapted to mate with a correspondingly shaped laterally inwardly extending counter-bearing structure of a first axial end of the body. By an entire insertion of the end plate into the body the end plate is at least circumferentially encompassed by the body. However, the end plate may at least partially protrude from the axial end of the body. By providing mutually corresponding bearing and counter-bearing structures on the end plate as well as at the inside facing side wall of the body, an axial stop or bearing for the end plate relative to the body can be provided.

By having such a unidirectional abutment and stop function between first end plate and body, e.g. a downwardly directed axial force acting on the end plate can be entirely transferred to the body via the mutually corresponding bearing structures. Additional or separate fastening means are therefore not required to fix the first end plate relative to the surrounding body.

According to a further preferred aspect, the fastening mechanism comprises a closed frame or frame element to surround a second axial end of the body. The frame element comprises a laterally inwardly extending bearing structure which is adapted to mate with a correspondingly shaped laterally outwardly extending counter-bearing structure of the second end of the body. Typically, the counter-bearing structure of the body comprises a flange-like contour. The inner diameter formed by the bearing structure of the frame element substantially corresponds with or is at least slightly larger than the outer diameter or cross section of the body. Since the inner diameter or cross section of the bearing structure of the frame element is smaller than the outwardly extending counter-bearing structure of the second end of the body, by way of a mutual axially directed abutment of bearing and counter-bearing structures, axially directed compression or tension forces can be transferred from the frame element to the body and vice versa.

Bearing- and correspondingly counter-bearing structures may comprise a plurality of laterally inwardly and outwardly extending stop elements. For providing a rather homogenous force distribution across the interface of frame element, end plate(s) and body, it is of further benefit, when bearing and counter-bearing structures comprise circumferentially extending rims or respective recesses. This way, axially directed tension or compression forces can be transferred across said interface regions in a material-protecting way. Point loads rising above maximum admissible levels can be effectively avoided.

In a further preferred aspect, the frame element comprises at least two laterally outwardly protruding portions that substantially overlap with corresponding fastening sections of a second end plate as seen in an axial projection. Since the frame element is unidirectionally fixed to the body by the above-mentioned mutually corresponding bearing- and counter-bearing structures, the frame element serves as a tension element to cooperate with the end plate in order to transfer a respective axially directed tension from the end plate to the body. Mutually corresponding laterally outwardly protruding portions of the frame element and the second end plate are intended to be rigidly interconnected with each other in axial direction. It is advantageous, when fastening sections of the second end plate are aligned with respective protruding portions of the frame element in axial direction.

Generally, a large variety of interconnecting mechanisms, e.g. clamping devices can be generally used here. In a further preferred aspect, the protruding portion of the frame element comprises a screw hole to receive an axially extending screw means extending through a respective hole of the corresponding fastening section of the second end plate. The screw means can comprise conventional tension bolts to be inserted through the holes of the end plate's fastening sections and to be screwed into corresponding screw holes of the frame element. This way, a considerable pressure can be applied to the stack of fuel cells sandwiched between oppositely disposed end plates. A respective counter force can be provided via the hollow profile-like body operably engaged with the oppositely arranged end plates in order to transfer an axially directed tension force between said end plates.

According to a further preferred aspect, the body engages with the first end plate and/or with the frame element all along the lateral circumference of the body. Correspondingly, respective bearing and/or counter-bearing structures of body, first end plate and/or frame element also extent all along the lateral circumference thereof.

In a further aspect, the body also comprises at least one elongated slit or slot intersecting a side wall portion in axial direction (z). By way of such a through opening of the hollow profile-like body, access to various membrane electrode assemblies or to selected bipolar plates can be attained, which is beneficial to monitor the voltage across the fuel cell stack.

Furthermore and according to another preferred aspect, the body is made of an electrically insulated material. This way, additional insulated sheets or insulating structures become superfluous and the electrically conducting components of the fuel cell stack can be directly arranged inside the body. Hence, the body itself is ready to receive fuel cells in a stacked configuration.

According to another preferred embodiment, the body of the housing assembly comprises a fiber enhanced or fiber reinforced plastic material and/or a fibrous composite material. Depending on the mechanical load, and temperature stress, a variety of plastic or composite materials can be used for the hollow profile-like body. Generally, even fiber reinforced plastic components can be manufactured in various geometries, e.g. by way of extruding or injection molding manufacturing processes. This way, a single pieced hollow profile-like body of arbitrary geometry and shape can be manufactured in a rather cost-efficient way.

For the arrangement of the various fuel cells inside the profile body it is of further benefit, when the body at least at its inward facing side wall sections comprises a symmetry breaking feature mating with the lateral or outer shape of the respective fuel cells to be arranged therein. This way, a mounting or installation direction is pre-defined by the structure or geometry of the profile body. A wrong or inadmissible arrangement of fuel cells in the body can be effectively prevented.

In a further preferred embodiment, the hollow body comprises a circular symmetric, an oval shaped or an at least in sections convex shaped outer cross-sectional profile. A rounded, oval or circular cross-sectional profile of the body is particular beneficial in terms of lateral load distribution. Accordingly, it is beneficial that the outer shape or outer cross section of the hollow body is free of edges, that are generally prone to mechanical impact.

In a further preferred aspect, a stack of fuel cells is disposed in the hollow profile-like body of the housing assembly. The fuel cell stack is typically clamped in axial direction (z) by way of the two end plates, wherein a counter force between said oppositely disposed end plate is transferred from the first or bottom end plate to the body, from the body to the frame element and from the frame element to the second or top end plate.

Moreover and according to an additional but independent aspect, the invention also relate to a fuel cell stack encompassed in a housing assembly as described above.

BRIEF DESCRIPTION OF THE DRAWINGS

In the following, preferred embodiments of the invention will be described in detail by making reference to the drawings in which:

FIG. 2 shows a side view of the housing assembly according to FIG. 1,

FIG. 3 illustrates a cross section along the intersection line A-A of FIG. 2,

DETAILED DESCRIPTION

Figure 1:
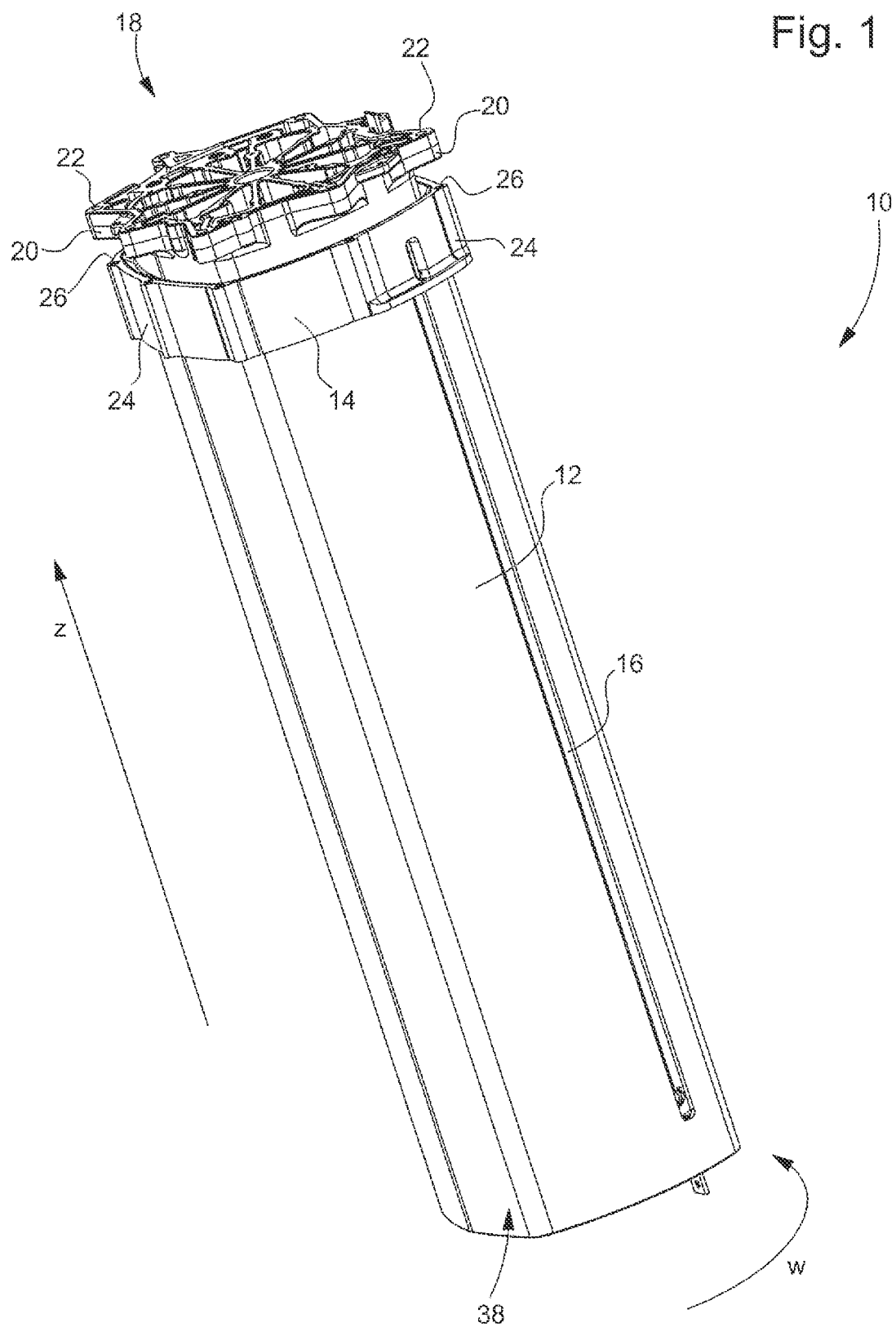
FIG. 1 shows a perspective illustration of the housing assembly.

FIG. 1 illustrates a housing assembly 10 to accommodate a stack of fuel cells. The housing assembly 10 comprises a rather elongated, almost tubular shaped hollow profile-like body 12 extending in an axial direction (z). The hollow body 12 is closed by way of two end plates 18, 28 arranged at a top end and at bottom end of the body 12 as can be seen in the cross section of FIG. 3. The end plates 18, 28, typically comprising structural metal plates are adapted to support the fuel cell stack to be sandwiched there between. Additionally, the end plates 18, 28 provide electrical contacting to the stack of fuel cells, which is not explicitly illustrated in the present set of Figures.

Figure 5:
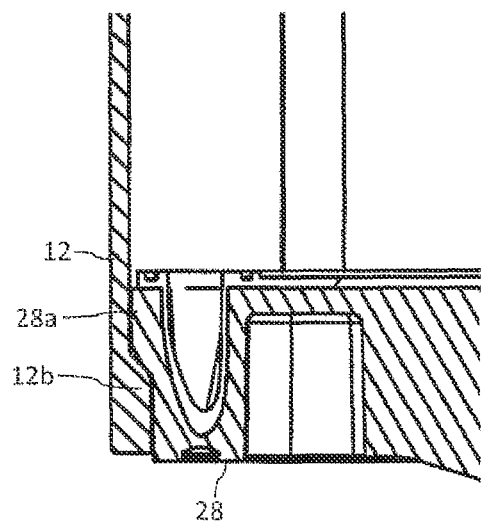

As shown in detail in FIG. 5, the lower and first end plate 18 is entirely inserted into the profile body 12. A laterally extending margin of the first end plate 28 thereby gets in direct abutment or contact with the circumferential side wall of the hollow body 12. In order to provide axially directed force transmission between the end plate 18 and the body 12, the end plate 28 comprises a laterally or radially outwardly extending bearing structure 28a which is adapted to mate and to cooperate with a correspondingly shaped inwardly extending counter-bearing structure 12b provided at the lower end of the body 12.

The radially protruding components counter-bearing structure 12b and bearing structure 28a are preferably integrally formed with the body 12 and/or with the end plate 28, respectively. By way of the mutual axial abutment of the first end plate 28 and the lower end section 12b of the body 12, downward directed forces acting on the end plate 28 can be effectively and entirely transferred to the body 12.

Figure 4:
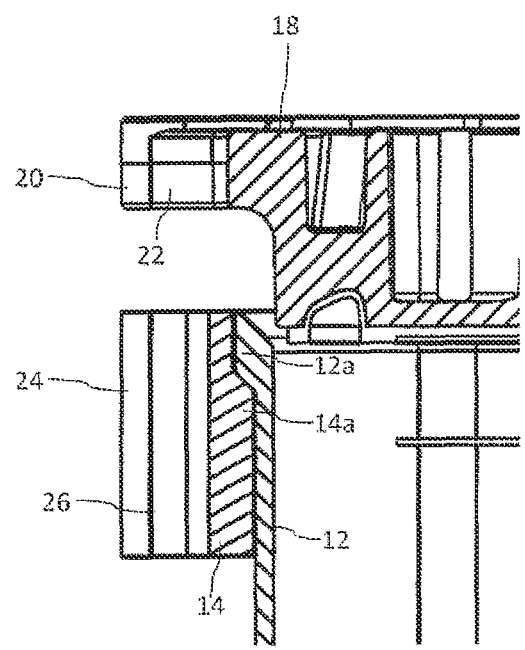
FIG. 4 shows an enlarged view of the upper interface between the body and the upper end plate according to FIG. 3, FIG. 5 provides an enlarged illustration of the lower interface section according to FIG. 3.

The upper end of the body 12 is depicted in FIG. 4 in an enlarged view. The opposite and upper end of the body 12 comprises a laterally outwardly extending counter-bearing structure 12a that mates with a correspondingly shaped laterally or radially inwardly extending bearing structure 14a of a closed ring or frame element 14, which, as illustrated in FIG. 1 entirely encompasses the circumference (w) of the body 12. With this unidirectional axial abutment, an upwardly directed force acting on the frame element 14 can be effectively transferred to the body 12.

In an assembly process, initially, the first end plate 28 has to be inserted into the body 12 from the top of the body 12 until the first end plate 28 engages with the radially inwardly extending counter-bearing structure 12b of the body 12 as shown in FIG. 5. Thereafter, several fuel cells can be stacked in the body 12 on top of the first end plate 28. The body 12 can be inserted into the surrounding frame element 14, which is to be moved until it engages with the radially outwardly extending bearing structure 12a of the body 12 as depicted in FIG. 4. In a final step of assembly, the second top end plate 18 is to be mounted on the stack of fuel cells. This end plate 18 comprises laterally outwardly extending fastening sections 20 that substantially overlap with correspondingly shaped and laterally outwardly extending protruding portions 24 of the frame element 14.

The portions 24 of the frame 14 and the outwardly extending sections 20 of the end plate mutually overlap in an axial projection in order to enable insertion of a screw through a hole 22 of the fastening section 20 to be further screwed in a screw hole 26 of the protruding portion 20 of the frame element 14. This way, an axial distance between frame element 14 and upper end plate 18 can be varied and a corresponding axially directed pressure can be applied onto the stack of fuel cells disposed between the two end plates 18, 28. With their axially inward facing surfaces 34, 32, a required pressure can be directly exerted to the stack of fuel cells.

The sideview according to FIG. 2 further illustrates a longitudinal slit 16 providing access to the various fuel cells or bipolar plates in order to monitor electric properties, in particular the voltage across the fuel cell stack during operation.

Figure 6:
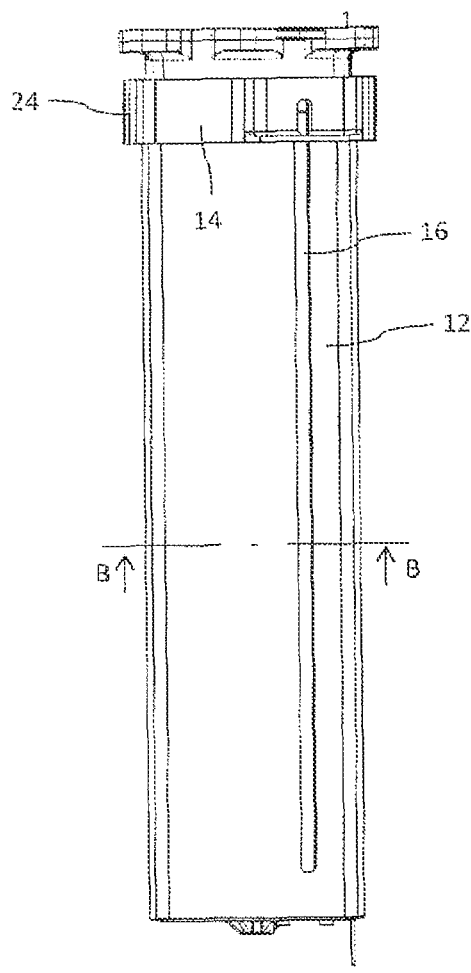
FIG. 6 shows another side view of the housing assembly.
Figure 7:
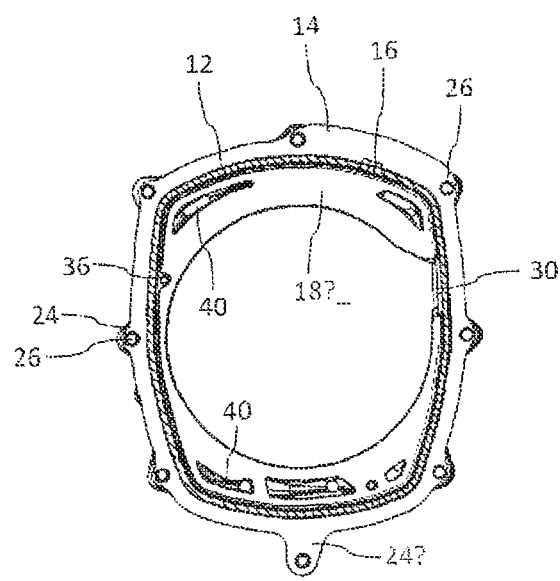
FIG. 7 is illustrative of a lateral cross section of the housing assembly along B-B of FIG. 6.

As illustrated in the cross section of FIG. 7 along the intersecting line B-B of FIG. 6, the cross-sectional profile of the hollow profile-like body 12 is almost rectangular but comprises rounded corners 38. Also, side wall sections extending between adjacent corner portions 38 are of substantially convex shape. Apart from the illustrated cross section, it is conceivable to have a circular symmetric, an oval or even a polygonal shaped cross section of the body 12 with rounded corner sections 38. Accordingly, the surrounding ring 14 or frame element 14 then also comprises a corresponding geometry and shape.

As further depicted in FIG. 6, a lug 30 extending in axial direction (z) and protruding from the body 12 serves as a conducting element by way of which electric current available at a current collector plate can be passed to an endplate. The current collector plate and the endplate, being not explicitly illustrated in FIG. 6, are electrically insulated e.g. by way of a plastic overmoulding structure.

In the cross section according to FIG. 7 also a symmetry breaking feature 36 is indicated comprising a radially inwardly protruding rib that mates with a correspondingly shaped recess of a fuel cell being not explicitly illustrated here.

In the cross section according to FIG. 7, the end plate 18 as well as the frame element 14 are shown from the bottom. In particular, in the portion of the frame element 14 located radially inwardly compared to the 12 hollow profile-like body 12, various gas transporting channels 40 are indicated that extend in axial direction (z).

LIST OF REFERENCE NUMERALS 10 housing assembly
12 hollow profile-like body
14 frame element
16 slit
18 end plate
20 fastening section
22 through hole
24 protruding portion
26 screw hole
28 end plate
30 lug
32 support surface
34 contact surface
36 symmetry breaking item
38 rounded corner
40 transport channel

What is claimed is:

1. A housing assembly for at least two fuel cells, comprising:
   a hollow profile-like body extending in an axial direction and being configured to laterally encompass at least two fuel cells stacked on one another in the axial direction;
   a first end plate and a second end plate respectively arranged at opposite end sections of the body, the first end plate being entirely inserted in the body and the body being configured to transfer axially directed tension force between the end plates; and
   a fastening mechanism to interconnect the body with the second end plate configured to support the at least two fuel cells;
   wherein the first end plate entirely inserted in the body comprises a laterally outwardly extending bearing structure configured to mate with a correspondingly shaped laterally inwardly extending counter-bearing structure of a first axial end of the body, the first one of the end plates thus resting on the counter-bearing structure at the first axial end of the body, so that forces from inside the body acting axially on the first one of the end plates are transferred to the body;

wherein the fastening mechanism comprises a closed frame element arranged to surround a second axial end of the body, said frame element comprising a laterally inwardly extending bearing structure configured to mate with a correspondingly shaped laterally outwardly extending counter-bearing structure of the second end of the body, the frame element comprising at least two laterally outwardly protruding portions substantially overlapping with corresponding fastening sections of the second end plate in an axial projection; and wherein a protruding portion of the frame element comprises a screw hole to receive an axially extending screw extending through a hole of the corresponding fastening section.

2. The housing assembly according to claim 1, wherein the body engages with the first end plate and/or with the frame element all along the lateral circumference of the body.

3. The housing assembly according to claim 1, wherein the body comprises at least one elongated slit intersecting a side wall portion in axial direction.

4. The housing assembly according to claim 1, wherein the body is made of an electrically insulating material.

5. The housing assembly according to claim 1, wherein the body comprises a fiber reinforced plastic material and/or fibrous composite material.

6. The housing assembly according to claim 1, wherein the lateral cross section of the body comprises a symmetry breaking feature mating with the lateral shape of the fuel cell.

7. The housing assembly according to claim 1, wherein the body comprises a circular symmetric, an oval shaped or an at least in sections convex shaped outer cross sectional profile.

8. The housing assembly according to claim 1 and having a stack of fuel cells disposed in the body being clamped in axial direction by way of the two end plates.

9. The housing assembly according to claim 1, wherein the first end plate is insertable into the body through the second axial end of the body.

10. The housing assembly according to claim 9, wherein the first axial end of the body is the bottom of the body and the second axial end of the body is the top of the body.

11. The housing assembly according to claim 10, wherein the laterally outwardly extending bearing structure of the first end plate is disposed above the laterally inwardly extending counter-bearing structure of the first axial end of the body.

* * * * *